(12) United States Patent
Stimits et al.

(10) Patent No.: US 9,849,433 B2
(45) Date of Patent: Dec. 26, 2017

(54) ELASTOMERIC HYDROGEN REACTOR WITH CLOG-LESS FILTER

(71) Applicant: Intelligent Energy Limited, Loughborough (GB)

(72) Inventors: Jason Stimits, Loughborough (GB); Gaelle Garozzo, Loughborough (GB); Hua Huang, Loughborough (GB); Russell Barton, Loughborough (GB)

(73) Assignee: Intelligent Energy Limited, Loughborough (GB)

( * ) Notice: Subject to any disclaimer, the term of this patent is extended or adjusted under 35 U.S.C. 154(b) by 0 days.

(21) Appl. No.: 15/293,095

(22) Filed: Oct. 13, 2016

(65) Prior Publication Data
US 2017/0028372 A1  Feb. 2, 2017

Related U.S. Application Data

(63) Continuation of application No. PCT/US2015/025652, filed on Apr. 14, 2015.

(60) Provisional application No. 61/979,951, filed on Apr. 15, 2014, provisional application No. 61/983,947, filed on Apr. 24, 2014, provisional application No. 62/030,551, filed on Jul. 29, 2014.

(51) Int. Cl.
*B01J 7/02* (2006.01)
*C01B 3/06* (2006.01)
*H01M 8/0662* (2016.01)
*H01M 8/04082* (2016.01)

(52) U.S. Cl.
CPC .............. *B01J 7/02* (2013.01); *C01B 3/065* (2013.01); *H01M 8/04208* (2013.01); *H01M 8/04216* (2013.01); *H01M 8/0687* (2013.01); *Y02E 60/362* (2013.01)

(58) Field of Classification Search
CPC .................................. C01B 3/00; C01B 3/065
See application file for complete search history.

(56) References Cited

U.S. PATENT DOCUMENTS

| 4,343,626 A | 8/1982 | Peise et al. |
| 7,147,597 B2 | 12/2006 | Wilkes |
| 8,105,729 B2 | 1/2012 | Ku et al. |

(Continued)

FOREIGN PATENT DOCUMENTS

| DE | 20318521 U1 | 3/2004 |
| WO | WO 2004/110875 A2 | 12/2004 |
| WO | WO 2012/017938 A1 | 2/2012 |

OTHER PUBLICATIONS

International Patent Application No. PCT/IB2015/001767; Int'l Preliminary Report on Patentability; dated Feb. 9, 2017; 13 pages.

(Continued)

*Primary Examiner* — Matthew J Merkling
(74) *Attorney, Agent, or Firm* — Baker & Hostetler LLP

(57) ABSTRACT

A hydrogen producing reactor having a pellet core within a containment vessel. The vessel having an exit nozzle surrounding the pellet. At least one elastomeric winding surrounding the containment vessel; and, a water line to deliver fluid to the pellet. Whereby the elastomeric windings compress the containment vessel around the fuel pellet as it is used. Hydrogen and other products produced by the reactor within a cartridge is filtered with a clog-less filter and substantially pure hydrogen is output.

17 Claims, 12 Drawing Sheets

(56) References Cited

U.S. PATENT DOCUMENTS

| | | | |
|---|---|---|---|
| 2003/0077411 A1 | 4/2003 | Hibino et al. | |
| 2005/0220369 A1 | 10/2005 | Sullivan, Jr. | |
| 2006/0062497 A1 | 3/2006 | Murray | |
| 2007/0037034 A1* | 2/2007 | Fisher | A61F 7/007 429/421 |
| 2008/0025880 A1* | 1/2008 | Shurtleff | B01J 7/02 422/112 |
| 2008/0098697 A1 | 5/2008 | Murray | |
| 2009/0258266 A1 | 10/2009 | Jang et al. | |
| 2009/0304558 A1* | 12/2009 | Patton | B01J 7/02 422/148 |
| 2010/0150824 A1* | 6/2010 | Withers-Kirby | B01J 7/02 423/648.1 |
| 2011/0070151 A1 | 3/2011 | Braithwaite et al. | |
| 2011/0194992 A1* | 8/2011 | Barton | B01J 7/02 422/239 |
| 2011/0200495 A1* | 8/2011 | Braithwaite | C01B 3/065 422/242 |
| 2012/0100443 A1 | 4/2012 | Braithwaite et al. | |
| 2012/0269694 A1 | 10/2012 | Zheng et al. | |
| 2014/0056772 A1* | 2/2014 | Stimits | C01B 3/065 422/162 |

OTHER PUBLICATIONS

International Patent Application No. PCT/IB2015/002051; Int'l Preliminary Report on Patentability; dated Mar. 9, 2017; 14 pages.
International Search Report and Written Opinion dated Aug. 20, 2015 in International Patent Application No. PCT/US2015/025652.
International Patent Application No. PCT/US2015/025652; Int'l Preliminary Report on Patentability; dated Oct. 27, 2016; 10 pages.

* cited by examiner

ELASTOMERIC HYDROGEN REACTOR WITH CLOG-LESS FILTER

CROSS-REFERENCE TO RELATED APPLICATIONS

This application is a Continuation of International Patent Application No. PCT/US2015/025652, filed Apr. 14, 2015, which claims full priority to Provisional Patent Application 61/979,951 filed Apr. 15, 2014, Provisional Patent Application 61/983,947 filed Apr. 24, 2014, and Provisional Patent Application 62/030,551, filed Jul. 29, 2014, the disclosures of which are incorporated by reference in their entirety.

FIELD OF THE DISCLOSURE

This disclosure relates to portable reactors which produce hydrogen.

BACKGROUND

With the increased use of mobile electronic devices, including, but not limited to, smart phones, laptop computers, and tablet computers, demand for portable power systems has increased. A popular solution is the use of rechargeable batteries, such as lithium-ion or lithium polymer batteries. For many mobile electronic devices, rechargeable batteries, even when replaceable by a user, are left in the device during use and charging of the battery.

Despite advances in battery designs leading to reduced size and increased capacity, rechargeable batteries impose a number of restrictions on users. First, battery capacity is often only enough to provide for a few hours of active use for many mobile electronic devices. For example, many laptop computers include batteries sufficient for around 5 hours of use, and many smartphones include batteries sufficient for approximately a full day's use. Second, rechargeable batteries must be recharged, which generally requires multiple hours to fully recharge a battery. The combined need to have an appropriate charging device on hand, access to an electrical outlet for the charging device, and adequate time to leave the mobile device attached to the charger for charging, imposes a significant inconvenience on users. Although some devices feature user-replaceable rechargeable batteries, and in theory a user might have an extra charged battery on hand, in practice users rarely find this to be a convenient solution.

Fuel cell technologies have advanced, in terms of size, reliability, and cost, to where fuel cell based power systems can replace or supplement conventional rechargeable battery based solutions. One advantage of fuel cell systems is increased energy density over rechargeable battery technologies. For example, a hydrogen fuel based fuel cell system, including the weight of hydrogen fuel, a storage canister for the fuel, a fuel cell stack, and a "balance of plant" for a fuel cell subsystem, can offer approximately a 1-fold increase in energy density over a lithium-based battery solution. As a result, in comparison to battery-based counterparts, fuel cell based power allows for lighter designs and/or greater run time.

However, fuel cell based power imposes a significant requirement: ensuring there is adequate fuel on hand. The fuel is volatile, and often compressed at a significant pressure, meaning that appropriate storage must be provided for the fuel. For example, the use of cartridges for storing compressed hydrogen is known in the art, and provides a safe and reliable mechanism for supplying fuel to fuel cell powered devices. However, a convenient mechanism for controlled distribution and reuse of such cartridges is required in order to achieve successful commercial application of fuel cell power technologies.

BRIEF DESCRIPTION

The file of this patent or application contains at least one drawing/photograph executed in color. Copies of this patent or patent application publication with color drawing(s)/photograph(s) will be provided by the Office upon request and payment of the necessary fee.

Disclosed herein are aspects of a reactor having a fuel core within a containment vessel and the vessel having an exit nozzle; around the vessel and to supply compressive force are at least one elastomeric winding; and, a water line to deliver fluid to the core and to produce hydrogen gas.

Disclosed herein are aspects of a hydrogen production cartridge and reactor having a body enclosing a fuel core within a containment vessel and the vessel having an exit nozzle; around the vessel and to supply compressive force are at least one elastomeric winding; a water line to deliver fluid to the core; an expanded PTFE tube having a sealed end and an open end fluidly connected to a valve; and, wherein fluid delivered to the core via the water line urges the core to produce hydrogen via a reaction and the hydrogen permeates the e-PTFE tube and is delivered to the valve. Becasue the e-PTFE tube is permeable to hydrogen it is in fluid connection with a hydrogen supply if it is exposed to such hydrogen. In some instances the cartridge reactor includes a desiccant placed within the e-PTFE tube. In some instances the cartridge reactor includes a hydrogen filter placed around the e-PTFE tube. In some instances the cartridge reactor includes NaOH within the body wherein the NaOH at least one of reduces the rate of reaction and reduces pressure.

Disclosed herein are aspects of a clog-less hydrogen filter unit having an envelope containing a separator material with a tube guide formed therein wherein an expanded PTFE tube, filled with a desiccant and having a sealed end and an open end is contained in the guide; and the e-PTFE tube is fluidly connected to a valve. In some instance desiccant material is also around the e-PTFE tube. In the clog-less filter the separator may either be at least in partial contact with the e-PTFE tube or not in contact with the e-PTFE tube.

Disclosed herein are aspects of a method of producing hydrogen from a cartridge with an elastomeric reactor and clog-less filter, the method includes placing a fuel pellet in a containment vessel which is wound with an elastomeric winding, the wound combination placed inside a wrapping in a sealed fuel cartridge, then adding at least water to the fuel pellet within the containment; whereby hydrogen gas and other products are produced from the water and fuel pellet reaction.

Disclosed herein are aspects of a method of producing hydrogen from a cartridge with an elastomeric reactor and clog-less filter, the method includes placing a fuel pellet in a containment vessel which is wound with an elastomeric winding, the wound combination placed inside a wrapping in a sealed fuel cartridge, then adding at least water to the fuel pellet within the containment; whereby hydrogen gas and other products are produced from the water and fuel pellet reaction and the gases produced are filtered with a clog-less filter to yield substantially pure hydrogen. In some instances the clog-less filter is connected to an e-PTFE tube containing at least desiccant; and output. In some instances additional desiccant material is placed around and in contact with the e-PTFE tube.

In the above methods the addition of a clog-less filter provides for less clogging and provides about twice the run time of a traditional filter system.

In the above methods the addition of a clog-less filter provides for less clogging and provides more than twice the run time of a traditional filter system.

In the above methods the addition of a clog-less filter provides for less clogging and provides more than two and ½ times the run time of a traditional filter system.

DRAWINGS

Figure 7A:
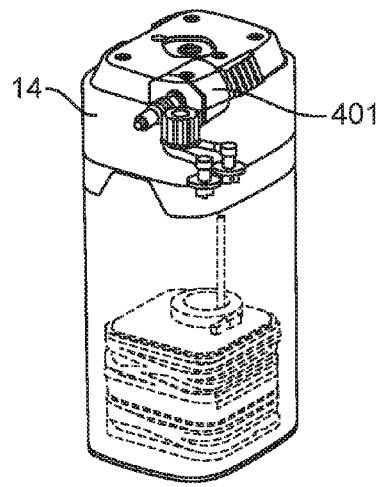
Figure 7B:
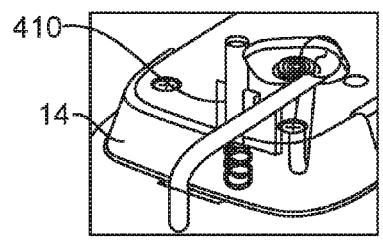
Figure 7C:
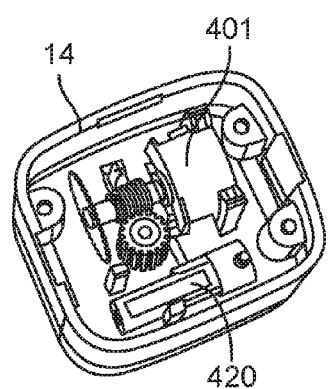
Figure 7D:
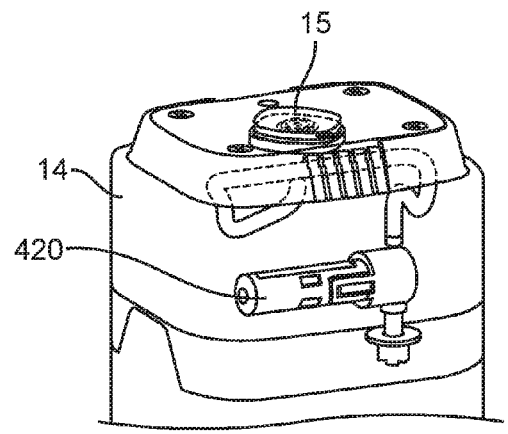
Figure 8:
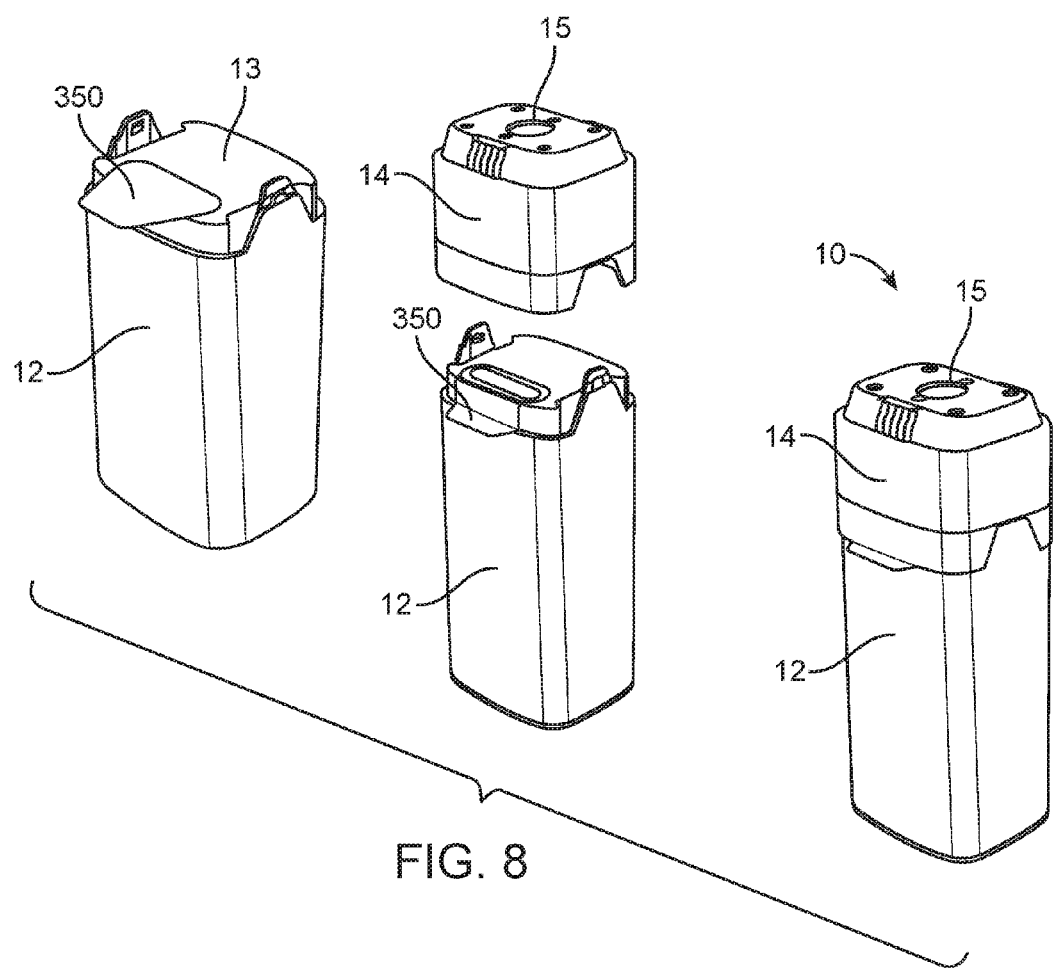

FIG. 7A-D illustrate aspects of the cartridge assembly with an adapter and some aspects of mechanical/electrical portions of some fluid management; and, FIG. 8 illustrates an assembly of the elastomeric hydrogen reactor with an adapter.

All callouts, figures, descriptions in the attached figures are hereby incorporated by this reference as if fully set forth herein.

It should be appreciated that, for simplicity and clarity of illustration, elements shown in the figures have not necessarily been drawn to scale. For example, the dimensions of some of the elements are exaggerated, relative to each other, for clarity. Further, where considered appropriate, reference numerals have been repeated among the Figures to indicate corresponding elements. While the specification concludes with claims defining the features of the present disclosure that are regarded as novel, it is believed that the present disclosure's teachings will be better understood from a consideration of the following description in conjunction with the figures and appendix in which like reference numerals are carried forward.

FIG. 1-8 disclose aspects of exemplary implementations of a reactor and cartridge for supplying hydrogen gas. The cartridge may be a unitary system or a hybrid. The cartridge 10 has a bottom 11 affixed to a lower body 12 which is generally hollow. The bottom 11 closes off a first end of the generally hollow lower body 12. An upper body 13 is affixed to the second end of the lower body 12. The lower body 12, bottom and upper body are bonded or sonically welded to seal them and prevent hydrogen leakage (via seals—see FIG. 6. An adapter 14 (which may be reusable) mates with the upper body 13 (via seals—see FIG. 6, 7A-7D). Hydrogen produced by the reactor within the cartridge is fed to a pressure valve 15 formed on the adapter 14. The valve is in fluid communication with gaseous hydrogen produced via a reactor 20 within the cartridge 10. Via the fluid communication hydrogen is supplied for use as a fuel source. Other balance of plant "BOP" components include, but are not limited to, a fuel pellet or core 22, elastomeric winding(s) 25 affixed around a containment "COT" 27 which surrounds the core 22. An exit nozzle 28 is within the COT 27. A woven bag or wrapping 29 such as nylon is placed around the reactor to limited exposure of the hydrogen collection means to waste products. A water or fluid input line 30 connection 55 for water or other fluid to pass into the reactor 20 to the core 22 is in fluid connection to a fluid reservoir 60. Water or other fluid reservoir(s) 60. A water line 100 provides fluid or water to the reactor. The water line 100 may be connected to a wicking 101 region to control water or fluid flow.

Figure 5A:
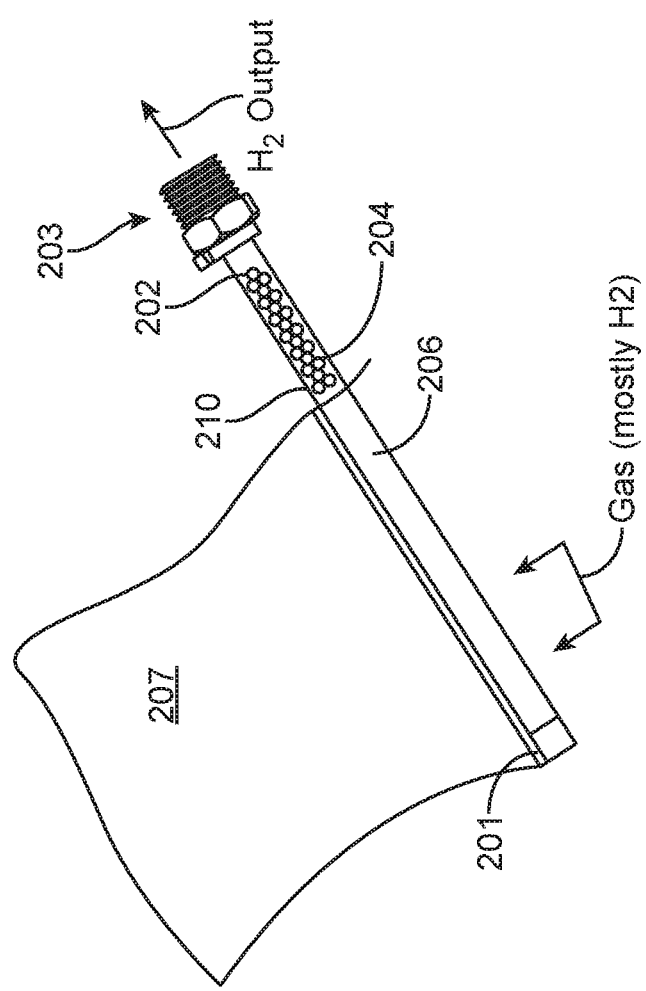
FIG. 5A illustrates the Hydrogen output pathway for fluid communication with an elastomeric hydrogen reactor.
Figure 5B:
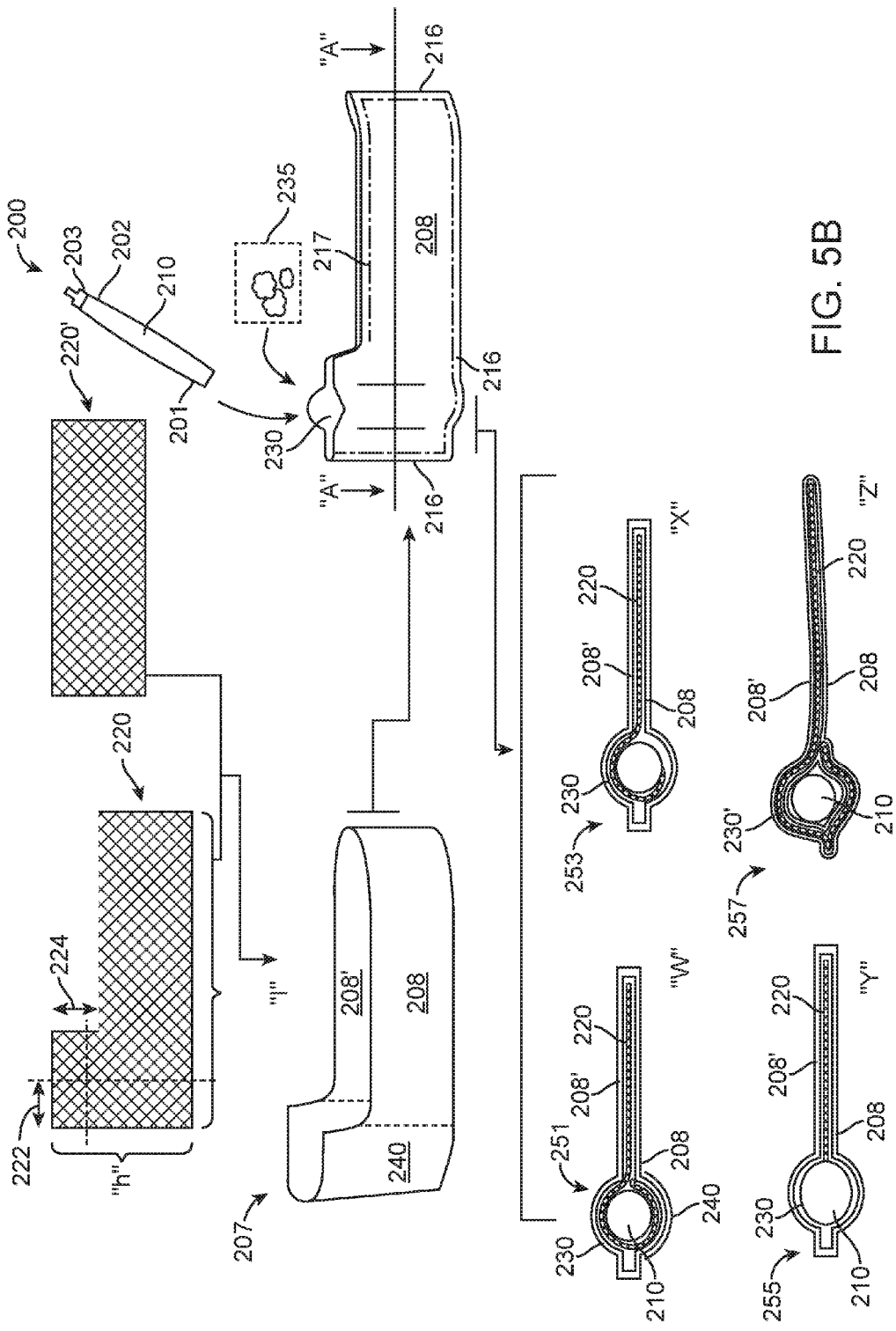
FIGS. 5B and 5C are assembly drawing showing aspects of hydrogen filter encasements and placement.
Figure 5C:
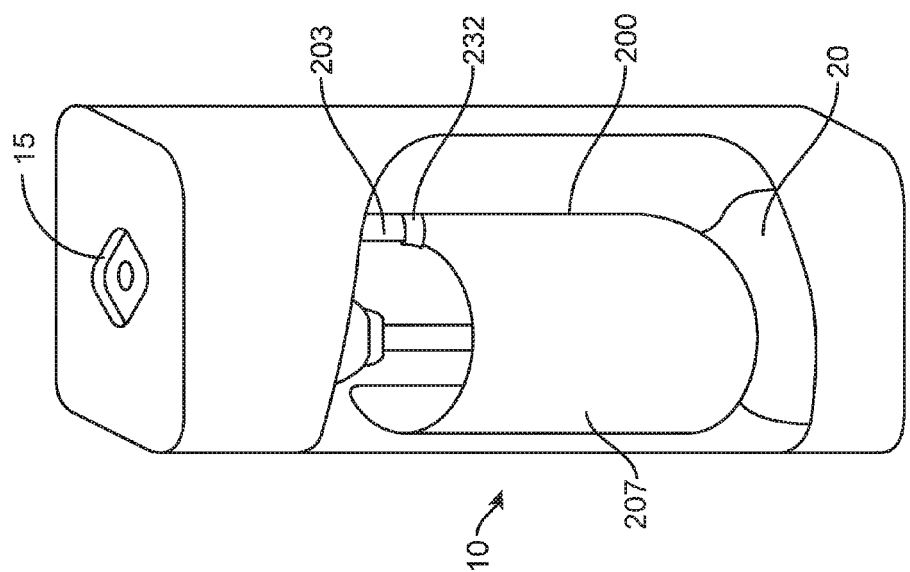

An expanded PTFE (e-PTFE) tube unit 200 is the fluid communication means to deliver hydrogen produced by the reactor to the valve 15. The e-PTFE tube unit 200 is sealed at a distal end 201 and open at its proximal end 202. PTFE is permeable to hydrogen. The proximal end 202 is connected to a connection fitting 203. Within the e-PTFE tube 210 is a desiccant material 204 through which hydrogen gas passes as it is transported from the reactor to the valve 15. The e-PTFE tube 210 may also be wrapped in a Hydrogen filter material 206 which is permeable to hydrogen and may filter out other non-hydrogen fluids. FIGS. 5B and 5C are assembly views of several clog-less hydrogen filter exemplars for the output portion of the elastomeric hydrogen reactor. Those of ordinary skill in the art will recognize that this clog-less filter arrangement has application to an output of hydrogen wherein non-hydrogen gas or vapor substances need to be removed prior to supply the hydrogen gas to a fuel cell.

Figure 5D:
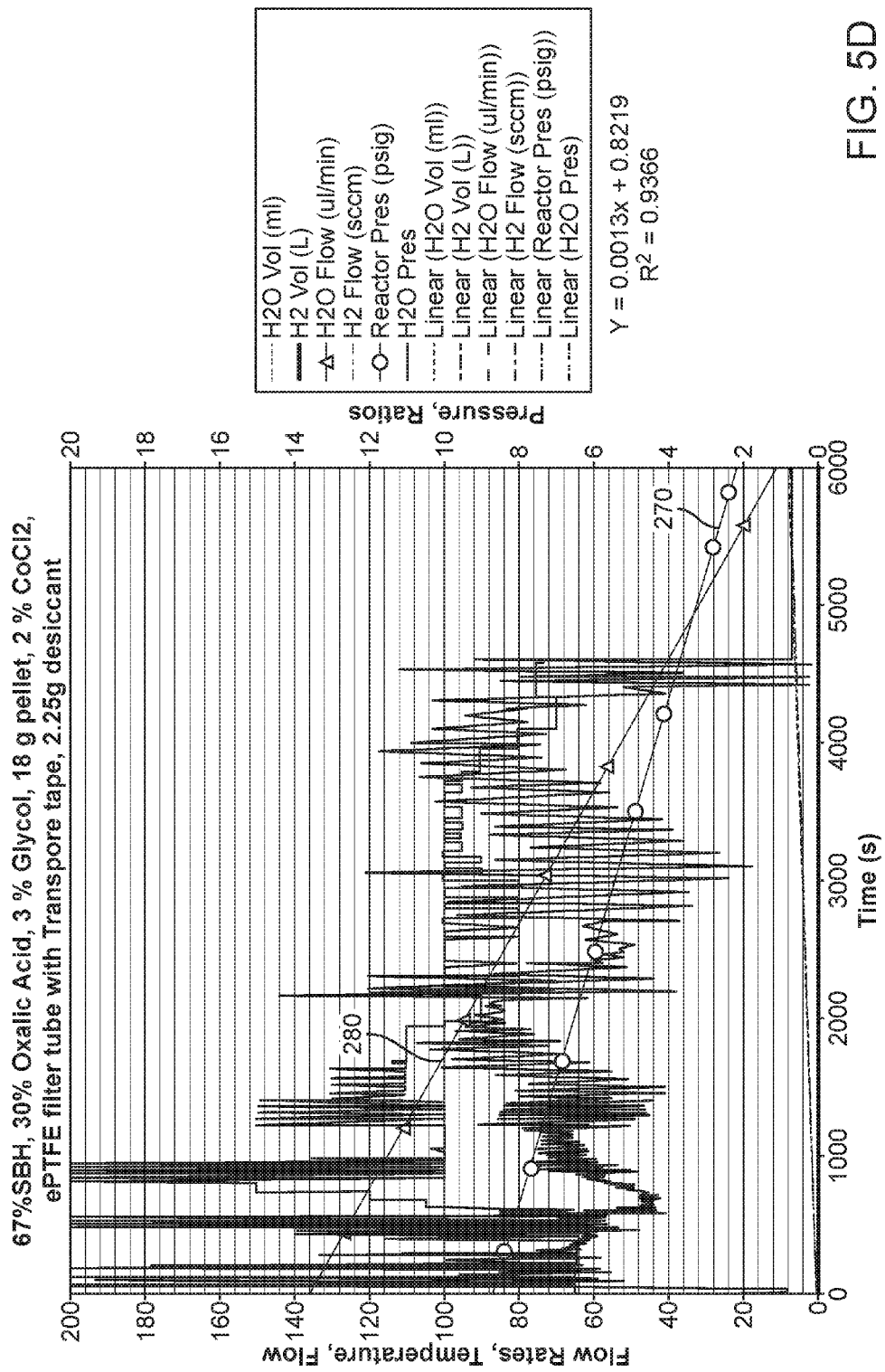
FIGS. 5D and 5E show charts of operational time which corresponds to output of $H_2$ of an elastomeric reactor with and without a clog-less filter arrangement.
Figure 5E:
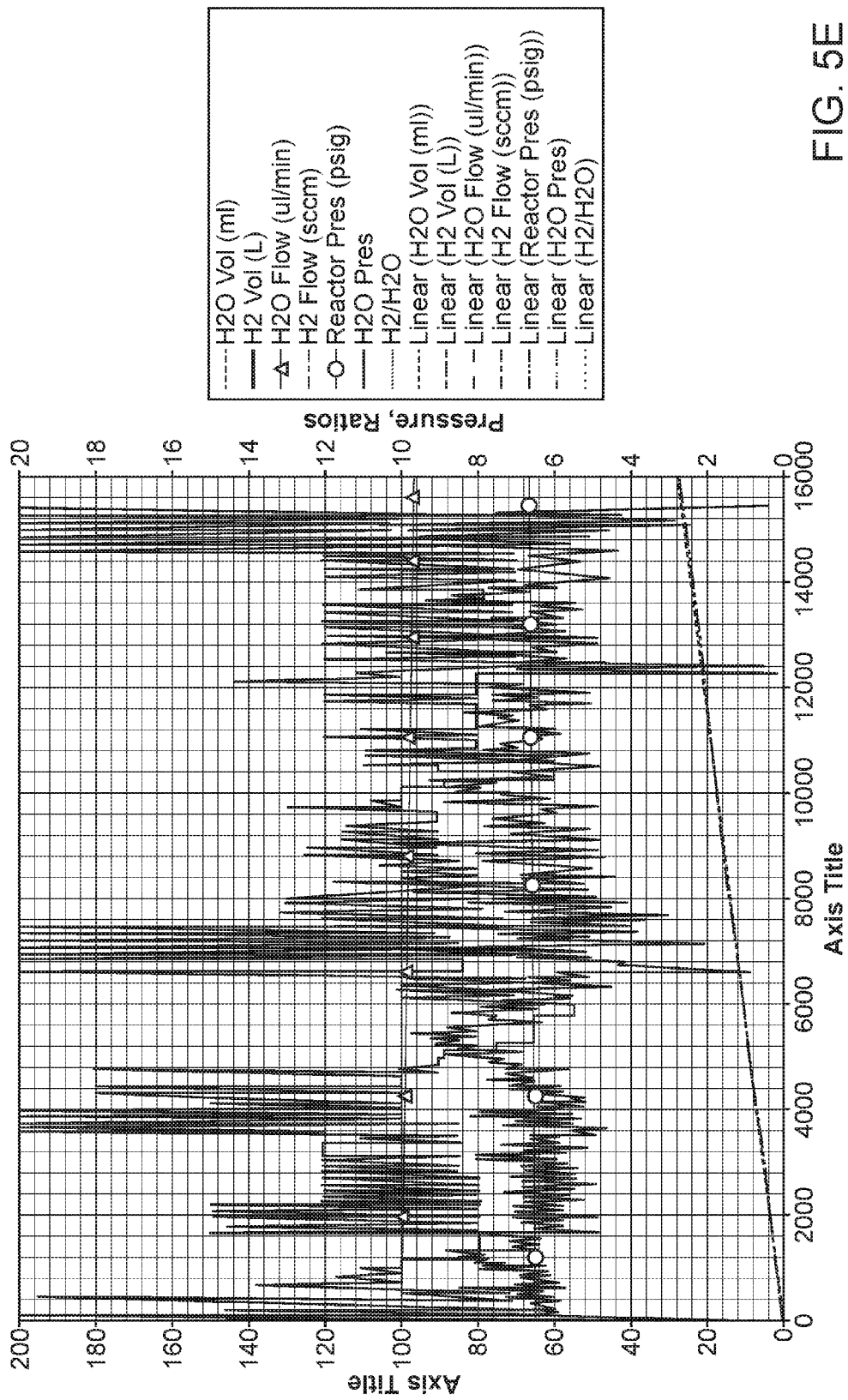

We have determined that the performance of the elastomeric reactor can be increased by preventing filter clogging during use. FIG. 5D shows a chart of the run time of an elastomeric hydrogen reactor with a traditional filter surrounding the e-PTFE hydrogen output as shown in FIG. 5A. The filter material 206 will become clogged thereby reducing the output and eventually shutting down the reactor due to increased internal pressure build up. The run time is under 6000 seconds and both the output pressure 270 of hydrogen gas and the water flow 280 drop off steeply as time runs out. Because the elastomeric reactor is producing hydrogen at 6000 seconds the inability to output filtered hydrogen causes a pressure build up which in turn could rupture the cartridge. To prevent rupture the hydrogen gas may be vented and/or the water pump will be shut down. In both instances hydrogen is lost and fuel wasted. A reactor that shuts down prematurely is less efficient and more costly. Conversely, FIG. 5E shows a chart of the run time of an elastomeric hydrogen reactor with a clog-less filter 207 surrounding the e-PTFE tube 210. The clog-less filters 207 is formed via capturing a separator in an envelope having a first side 208 and a second side 208' which is then sealed 216 at the bottom and the side edges. A porous "L" shaped separator 220 which may be a mesh structure is connected to the e-PTFE tube 210. Material that may be used for the separator include but are not limited to polyethylene, poly propylene, woven materials, nonwoven materials, battery separators, PTFE membranes, Tyvek type material, fabrics and other flexible material which are non-reactive to hydrogen gas. The length "l" 222 of the mesh may be varied and the height 224 "h" of the mesh may also be varied to form the alternate exemplary shown in FIG. 5B "W-Z". The shaped separator may also be rectangular 220'. In some instances the e-PTFE tube is placed in a tube guide 230 formed inbetween the first side 208 and a second side 208' and the separator 220 wraps partially around the e-PTFE tube 210 (see "W") in other instances the separator 220 wraps partially around the e-PTFE tube 210 (see "X"). In other instances the tube guide is formed by circling the e-PTFE tube with the clog-less filter 207 (see "Z").

The clog-less filter 207 is preferably formed of a cellulose based material, the cellulose ha the properties of being porous enough to allow hydrogen to easily pass through and absorbent enough to scavenge some of the water vapour produced during the reaction without closing off the flow of hydrogen gas to the e-PTFE tube 210. The envelope 207 is positioned in the cartridge body to provide maximum surface area for hydrogen collection. By utilizing this type of extended filter surface area can be increased by a factor of 10-15 times or more. By separating the sides 208 and 208" of the envelope clogging, primarily due to water vapour is reduced. The e-PTFE tube 210 is sealed 232 to the envelope 207 at or near the connection fitting 203. The envelope is preferably loosely packaged within the cartridge wherein most of the surfaces are exposed to the gaseous environment in the cartridge as opposed to being in physical contact with themselves. It is preferred that the filter material not wrap or fold on itself.

During assembly, the separator 220/220' is inserted in the filter envelope 207 having two generally planar sides 208/208' open at the top and sealed 216 around the bottom and sides forming a cavity to accept the separator 220/220'. After insertion of the separator the envelope is sealed 217 forming a tube guide 230 wherein the e-PTFE output tube 200 is later inserted. Prior to inserting the e-PTFE tube, or commensurate with inserting the e-PTFE tube 210 into a tube guide 230 a quantity of desiccant material 235 which should be contiguous to the e-PTFE tube 210 is added. The region of the envelope that forms the around the outside of the tube guide may be referred to as the tube region 240.

The separator may be shaped in the tube guide 230 to surround the tube 251, or to partially surround the tube 253 in both cases the separator is against at least a portion of the e-PTFE tube 210. When utilizing a mesh like separator the mesh can also support at least some of the added desiccant material 235. In other cases the separator may end prior to the tube guide 255. Finally, the separator—envelope combination may have the separator fill the entire envelope and the tube region 240 is then rolled in on itself to form a tube guide 230' wherein the separator 220/220' is separated from the e-PTFE tube 210 by at least a layer of envelop FIG. 5E illustrates the second run time of an elastomeric reactor which has a clog-less filter 207. The run time is over 16000 seconds and both the output pressure 270 of hydrogen gas and the water flow 280 are substantially steady as time runs. Because of the longer run time all or at least more of the fuel is utilized, pressure build up is reduced, the chance of a critical failure such as a burst is reduced and the reactor will run longer and provide more hydrogen from the same amount of fuel as a traditional reactor would.

Figure 6:
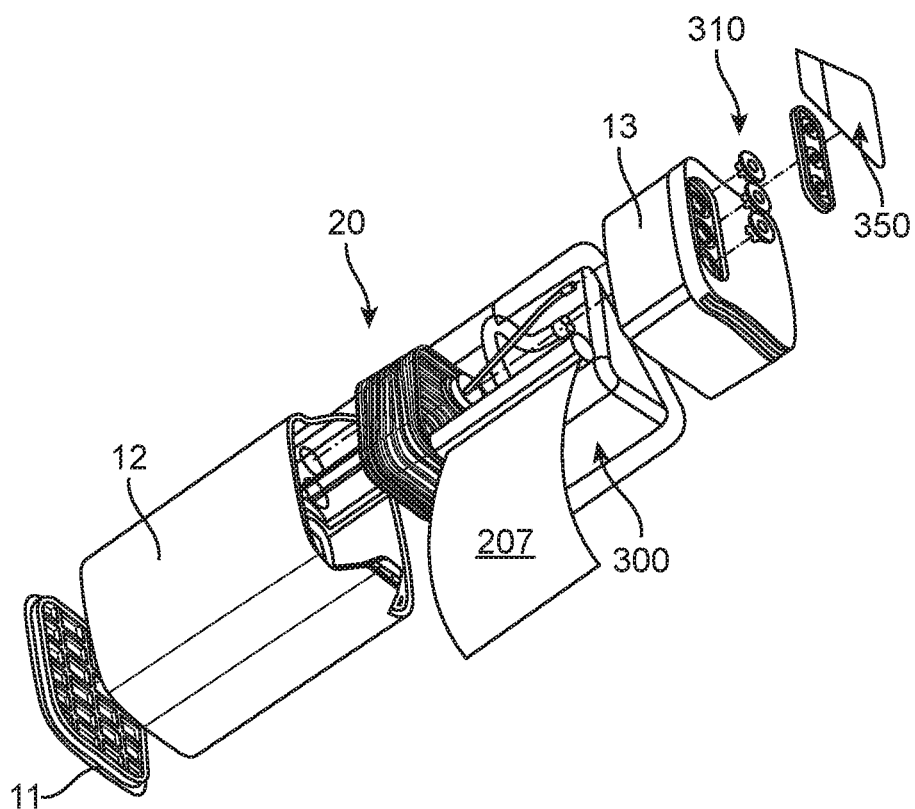
FIG. 6 illustrates aspects of the assembly of the elastomeric hydrogen reactor.

FIG. 6 illustrates an assembly view of the elastomeric reactor in housing for use in a cartridge. A fluid container or bag 300 in some exemplary implementations is filled with De-ionized water and a Catalyst mix. The upper body 13 provides one or more sealed valves 310 fluidly connected to the e-PTFE tube for delivering hydrogen to the adapter 14. The valves 310 are protected by a sealed foil-like member 350.

Reactor Design and Aspects of Features within the Reactor and Cartridge.

1. Use of Elastomeric Winding 25.
  a. Description: Elastomers are wound around the fuel pellet 22 and its wrapping COT 27.
  b. Actions, method of action:
    i. The elastomeric winding(s) force reaction products from reaction site and exposes fresh reactants
    ii. The elastomeric winding(s) reduce pooling of products and reaction fluid (pooling causes poor performance, low utilization, requires excessive water, sluggish H2 control, uncontrollable H2 after shut down)
    iii. The elastomeric winding(s) reduce compression set which is inherent in other designs such as the stretched silicon bag and others
    iv. The elastomeric winding(s) are adapted to apply variable force if desired (i.e. more force in back of pellet than in front)—stretched bag designs cannot! Such windings need not be a unitary piece. Several windings of different stretch and force properties may be combined. Variations in thickness, length and elasticity may be applied to shape or control the compression. Elastic and rubber-like materials are used.
    v. The elastomeric winding(s) provide compression until pellet 22 is fully dehydrogenated. Conversely a traditional bagged or compression tube will stop compressing once it reaches its starting diameter
    vi. The elastomeric winding(s) provide assembly advantages via a winding machine which winds after the core 22 is placed in the COT 27.
2. Use of Reaction Products to Dehumidify 112 Stream
  a. As disclosed in FIGS. 1-8 and appendices A and B the reaction products can, in some exemplary implementations, be routed to form at least a partial wall between the reacting pellet and the H2 out port. The reaction products are hydroscopic and will tend to dry out the H2 stream provided the H2 is forced to pass through them. Accordingly, this method of flow reduces the amount of desiccant required thereby reducing volume and/or costs.
3. Exit Nozzle 28 Dictate Characteristics of Reaction Products
  a. Description: Size, design, and location of the exit nozzle can be used to customize the characteristics of the reaction products. Smaller nozzles and/or nozzle placement where it is more difficult for reaction products to flow toward will increase residence time in the reactor and result in increased fuel utilization, lower water ratios, much dryer products, less unreacted material and thus quicker H2 flow response to water pump shut down. Larger nozzles and/or nozzle placement at a location where products can find the nozzle quickly will result in a more liquid product and with less initial volume per unit mass.
  b. Benefits
    i. Nozzle location and size allows the reactor designer to optimize the reactor design and containment of the products
    ii. Can result in improved characteristics both performance and energy density
4. COT 27 is a Thin Latex or Rubber-Like Material
  a. Description: Natural rubber or latex material can be used as either a wrap around the pellet.
  b. Benefits
    i. Such COT 27 material is thin and durable and results in more energy dense systems vs thicker walled materials.
    ii. Easier to assemble when using preformed finger cots (since one end is already sealed)
    iii. Significantly less expensive than silicon rubber
    iv. Reduced compression set
5. Use of a Woven Bag 29 to Protect Ports and 112 Filter 206
  a. Description: a thin woven nylon bag loosely encloses the reactor. When reaction products are expelled from the reactor, the majority of the products clump inside the nylon bag and are kept away from the H2 filter and ports to help prevent clogging. Even if products expand to the point of contacting the ports or filter they typically will not fully surround then due to restriction by the bag material.

b. Benefits:

i. Reduced clogging of the ports—able to put more fuel in the cartridge without it clogging ii. Eliminates the need for other filtration material 6. Use of Hydrophobic, 112 Permeable Membrane 206 to Protect the—ePTFE H2 Filter.

a. Description: A membrane material with adhesive on one side and which is both hydrophobic and permeable to H2 is one of wrapped around the e-PTFE H2 filter and connected to the e-PTFE H2 filter with the envelope loosely placed inside the cartridge.

b. Benefits:

i. The membrane (which is found on some types of Band-Aids) helps prevent the H2 filter from clogging.

ii. Fluid beads off the surface and keeps the H2 filter open and exposed to H2 gas in the cartridge.

iii. Also provides a secondary physical barrier to products Fuel/Chemistry

1. Use of hybrid chemistry (catalyst plus acid) as fluid a. Description: It was found that the use of catalyst alone or acid alone resulted in variable performance each with particular draw backs. A system was designed where both could be used in the same system but added in different ways resulting in ideal reaction characteristics b. Benefits i. Catalyst alone resulted in: Relatively high activity but because catalyst level is variable through reaction due to catalyst sites being blocked and then exposed, H2 variability was high. In addition when sites were blocked unreacted material would move out of the reactor too soon and result in continuous H2 generation outside the reactor resulting in slow response to water pump shut down.

ii. Acid alone results in: More stable H2 flow but less active overall and more water was required to carry out the reaction so lower energy density.

iii. Combination of the two:

(a) Dehydrogenation activity much higher than either by itself (b) Requirement of significantly less water to generate the same amount of H2

(c) Quicker start up than either on its own (30 seconds)

(d) Quicker shutdown when pump shuts off than either on their own (e) More stable H2 flow than either by itself 2. Use of NaOH or other caustic to neutralize reactants after leaving the reactor to minimize residual H2 production and allow for passage of the regulatory testing which calls for no more than 16 mg/hr of H2 to be vented upon shut down.

a. Description: NaOH or other neutralizing material can be applied to the reaction by products in different forms and locations to 1) increase the pH of the reaction by-products and 2) displace the catalyst. Both avenues of neutralization support quicker reactor shutdown.

i. Method 1) in some instances NaOH or other neutralizing material pellets or powder are applied outside the reactor and near the exit. When products which are partially liquid exit, the residual liquid dissolves the solid NaOH, which increases the pH and displaces the catalyst and expedites reaction shutdown.

ii. Method 2) in some instances NaOH or other neutralizing material is pressed as a separate part of the pellet or core 22. For instance NaOH would be loaded first into a press, then pressed, the ram removed from the die, then the fuel material loaded, then the fuel material would be pressed on top of the NaOH material. This would form a two phase pellet with fuel on one end and neutralization material on the other end. A second discrete pellet could also be pressed and added to the reactor separately. In this application water would be applied to the fuel side, then reaction products would be formed and travel to the neutralization side where the residual fluid in the by-products would dissolve some of the NaOH and neutralize the reaction.

iii. Method 3) in some instances the NaOH or other neutralizing material is encapsulated. In this instance the NaOH would be encapsulated with a time released material that would only allow the NaOH to be exposed after a specific time delay after coming in contact with water or other activating agent. Specifically in our reactor, the encapsulated NaOH material would be blended and mixed with the fuel blend and pressed together homogenously. When water is dispensed onto the fuel pellet the encapsulated material is activated and after a certain time delay the NaOH would be exposed. The time delay would be engineered such that the NaOH would not be exposed prior to leaving the reactor. Therefore if it took 5 minutes on average for fuel by-products to leave the reactor after first being exposed to water, then the time delay would be set for 5 min or longer. This allows the NaOH to be added directly to the reactor without adversely affecting the primary H2 generating reaction until after leaving the chamber.

b. Benefits:

i. Selectively providing NaOH or other neutralizing material is useful in maintaining desired pressure controls.

ii. Adds another safety factor to the cartridge. For instance if the water bag breaks for some reason, the NaOH can neutralize the water prior to entering the reactor, thus, preventing or limit a runaway reaction.

iii. NaOH is hydroscopic and can help prevent humidity getting to the fuel pellet prematurely.

3. Addition of 12% HCL to the water a. Description: in some instances about 12% HCL is added to the water to lower the freezing point to below 20 C.

Fuel Examples: TestS showed that a balance of purity and percentages of components achieve a fuel with a high efficiency controlled release and with a moderate amount of water. Aspects of such a mix include a reactor chemical mix, chemical type and percentage as follows: 70% Sodium Borohydride "$NaBH_4$" (SBH), 30% Oxalic Acid (in powder form) Liquid/powder etc. The liquid portion is made up of 86% distilled or deionized water, 12% HCL, and 2% Cobalt chloride hexahydrate "$CoCl_2.6H_2O$". The HCL is currently added to the water in liquid form The CoCl2 comes in pellet form and dissolved readily in a matter of seconds with moderate stirring/mixing.

In the above mixture the $NaBH_4$ should be at least 50% pure. Oxalic acid should be at least 10% pure, The $CoCl_2.6H_2O$ should be at least 1% pure. In the above mixture it is preferred that the $NaBH_4$ should be greater than 50% pure. Oxalic acid should be greater than 10% pure, The $CoCl_2.6H_2O$ should greater than 1% pure. In the above mixture it is more preferred that the $NaBH_4$ should be at least about 90% pure. Oxalic acid should be at least about 50% pure, The $CoCl_2.6H_2O$ should at least about 20% pure.

In the above mixture it is most that NaBH4 should be at least about 98% pure. Oxalic acid should be at least about 99.6% pure, The $CoCl_2.6H_2O$ should be at least about 98% pure. The above mixture has been shown to yield a water to SBH molar ratio of about 3.7:1. The ratio is significant in that less water equates to less mass in the cartridge form.

Other formulations which we have tested show that SBH and acid alone result in molar ratios of SBH to acid in the range of above 5:1. The reactor tested containing about 23.9 g total weight of the above mixture produced about 27 L of $H_2$.

Fuel Mix Process Requirements and Environmental Controls

During blending operation fuel mix should be under inert conditions. When powder components are exposed, they should be kept in an inert environment or at a minimum in an environment with RH<10%. Powders should only be mixed for the minimum amount of time (currently 5 min) and without any media or any component that applies friction to the powders. Extended processing time or any process or blending aids could result in a more active fuel mixture that would be increasing sensitive to air and moisture. Process controls should be in place to ensure these situations are avoided. As with many powders, process controls should be in place to avoid dust explosions. Static controls should be in place as sparks could initiate the powder materials individual or while in a mixture. All equipment and tools that come into contact with the fuel mix should be thoroughly dry at all times.

FIGS. 7A through 8 illustrated aspects of the cartridge assembly with an adapter 14 and some aspects of mechanical/electrical portions of some fluid management. FIG. 8 also illustrates the connection of a reusable adapter 14 over an upper and lower body 12/13 combination. Within the adapter 14 is a motor 401, pump and pump head 402 to drive a peristaltic pump 420. Also within the adapter is a poppet pinch valve 410 and pressure relief valve 15.

Figure 1:
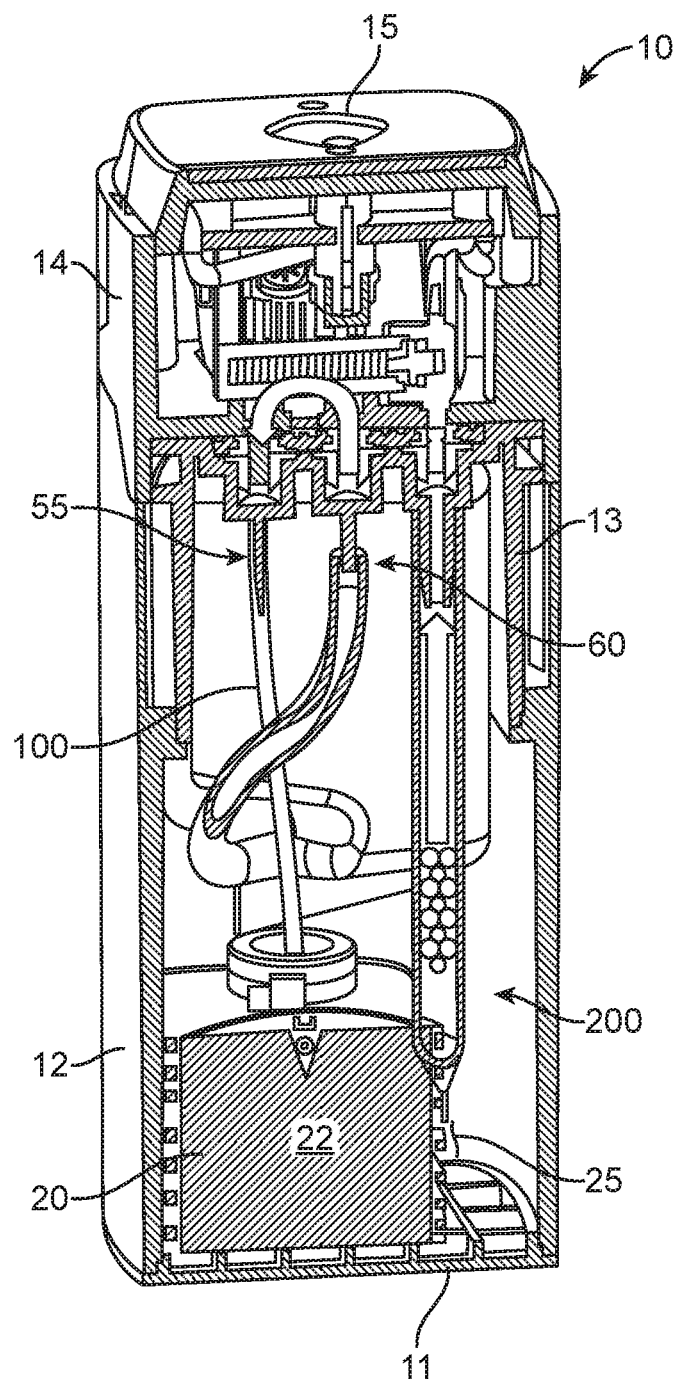
FIG. 1 illustrates aspects of an elastomeric hydrogen reactor device and system.
Figure 2:
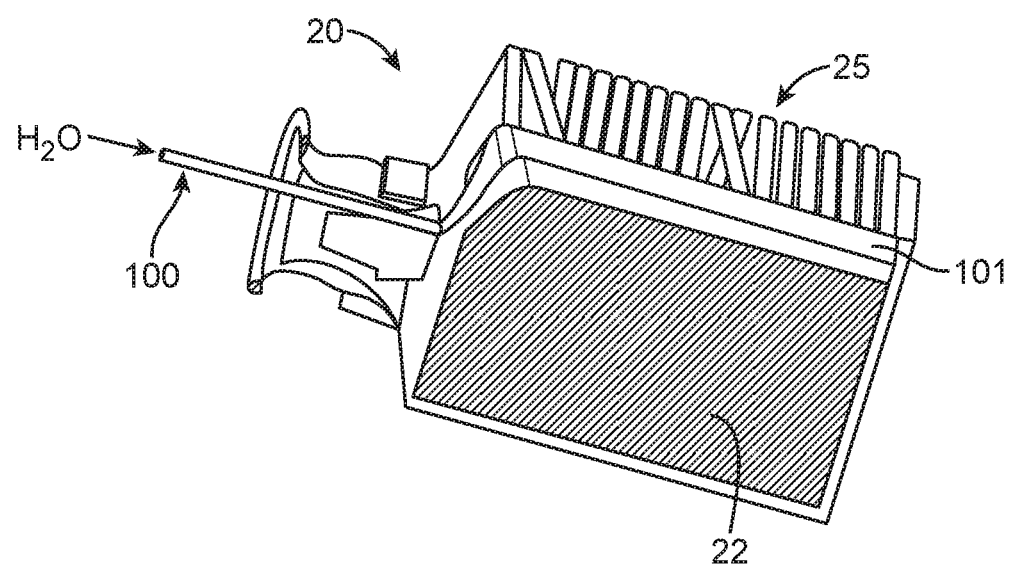
FIG. 2 illustrates aspects of an elastomeric hydrogen reactor.
Figure 3:
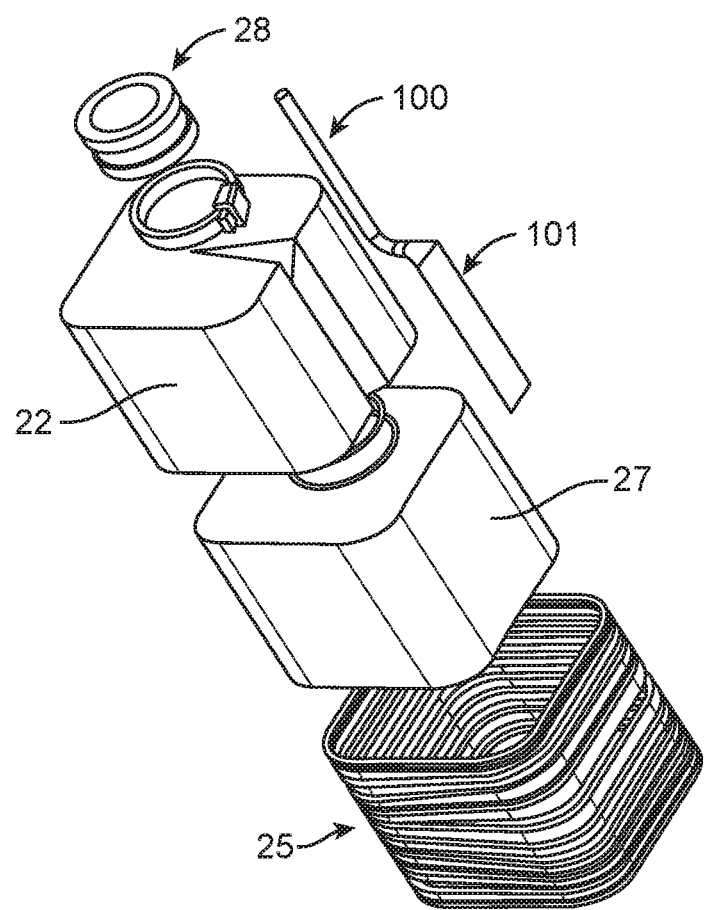
FIG. 3 illustrates some components of an unassembled elastomeric hydrogen reactor.
Figure 4:
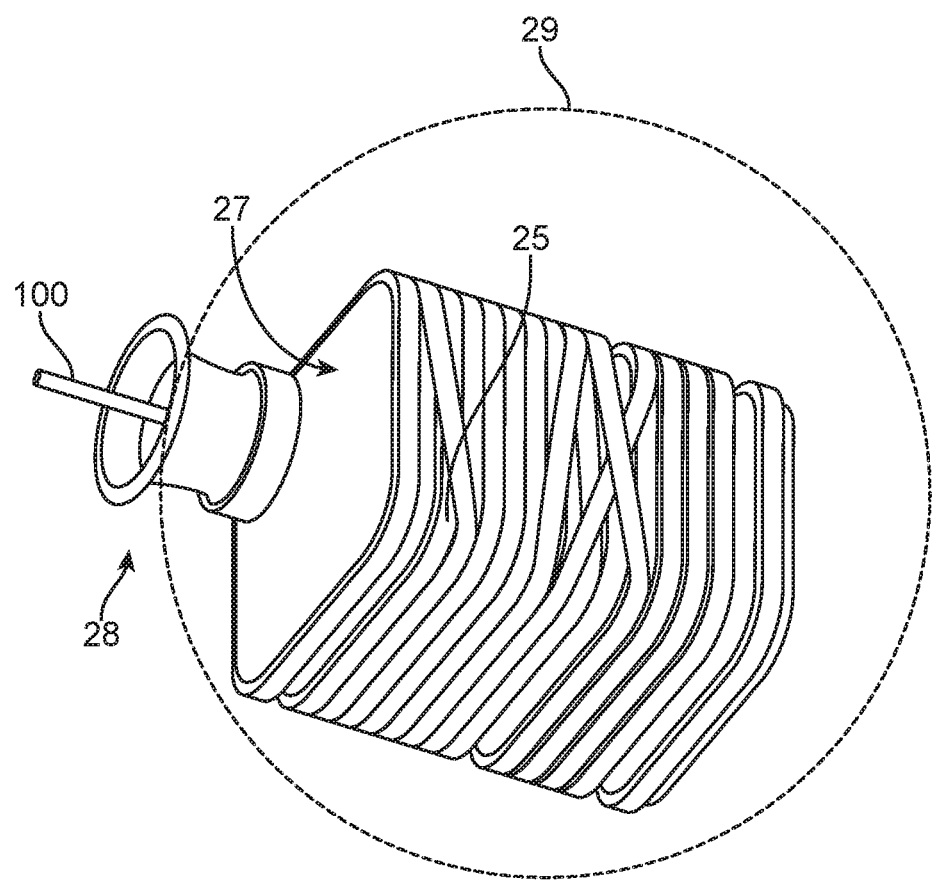
FIG. 4 illustrates an assembled elastomeric hydrogen reactor.

Those of ordinary skill in the art will appreciate that the above disclosure, in which particular methods or techniques may be described in relation to particular items illustrated in FIG. 1, is merely for the purpose of illustration, and that it is within the ordinary skills of the art to alternatively perform such methods or techniques with other items illustrated in FIG. 1. Such alternatives merely illustrate the ease with which, particularly where systems can exchange data with each other, programmed functionality can be moved and/or distributed among a plurality of programmable processors.

It is to be understood that any feature described in relation to any one aspect may be used alone, or in combination with other features described, and may also be used in combination with one or more features of any other of the disclosed aspects, or any combination of any other of the disclosed aspects. Furthermore, equivalents and modifications not described above may also be employed without departing from the scope of the disclosed subject matter.

The many features and advantages of the disclosed subject matter are apparent from the detailed specification, and thus, it is intended by the appended claims to cover all such features and advantages of the disclosed subject matter which fall within the true spirit and scope of the disclosed subject matter. Further, since numerous modifications and variations will readily occur to those skilled in the art, it is not desired to limit the disclosed subject matter to the exact construction and operation illustrated and described, and accordingly, all suitable modifications and equivalents may be resorted to, falling within the scope of the disclosed subject matter.

Further, each of the various elements of the disclosure and claims may also be achieved in a variety of manners. This disclosure should be understood to encompass each such variation, be it a variation of an implementation of any apparatus implementations, a method or process implementations, or even merely a variation of any element of these.

Particularly, it should be understood that as the disclosure relates to elements of the disclosure, the words for each element may be expressed by equivalent apparatus terms or method terms—even if only the function or result is the same.

Such equivalent, broader, or even more generic terms should be considered to be encompassed in the description of each element or action. Such terms can be substituted where desired to make explicit the implicitly broad coverage to which this disclosure is entitled.

It should be understood that all actions may be expressed as a means for taking that action or as an element which causes that action.

Similarly, each physical element, disclosed, should be understood to encompass a disclosure of the action which that physical element facilitates.

To the extent that insubstantial substitutes are made, to the extent that the applicant did not in fact draft any claim so as to literally encompass any particular exemplary implementations, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative exemplary implementations.

Further, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps.

Such terms should be interpreted in their most expansive forms so as to afford the applicant the broadest coverage legally permissible.

The invention claimed is:

1. A reactor cartridge comprising:
a body (11, 12, 13) enclosing:
a core within a containment vessel having an exit nozzle;
at least one elastomeric winding surrounding the containment vessel;
a water line to deliver fluid to the core;
an expanded PTFE tube (210) having a sealed end (201) and an open end (202) fluidly connected to a valve (310); and,
wherein fluid delivered to the core via the water line urges the core to produce hydrogen via a reaction and the hydrogen permeates the ePTFE tube and is delivered to the valve.

2. The reactor cartridge of claim 1, further comprising a desiccant (204) placed within the e PTFE tube.

3. The reactor cartridge of claim 1, further comprising a hydrogen clog-less filter (207) placed around the e-PTFE tube.

4. The reactor cartridge of claim 1, further comprising a desiccant placed around the e-PTFE tube when it is wrapped in the clog-less filter.

5. The reactor cartridge of claim 1, further comprising NaOH within the body wherein the NaOH at least one of reduces the rate of reaction and reduces pressure.

6. The reactor catridge of claim 1 wherein the core is a solid portion of about 70% Sodium Borohydride "$NaBH_4$" (SBH) and about 30% Oxalic Acid; and, the fluid is a liquid portion of about 98% distilled water, and 2% Cobalt chloride hexahydrate "$CoCl_2.6H_2O$".

7. The reactor catridge of claim 1 wherein the core is a solid portion of about 70% Sodium Borohydride "$NaBH_4$" (SBH) and about 30% Oxalic Acid; and, a liquid portion of about 86% distilled water, about 12% HCL and about 2% Cobalt chloride hexahydrate "$CoCl_2.6H_2O$".

8. The reactor cartridge of claim 6 wherein the NaBH4 should be at least about 98% pure. Oxalic acid should be at least about 99.6% pure, The $CoCl_2.6H_2O$ should be at least about 98% pure.

9. The reactor cartridge of claim 6 wherein the reactor containing about 23.9g total weight of the fuel mixture produces about 27L of $H_2$.

10. The reactor cartridge of claim 1 wherein the expanded PTFE tube (210) having a sealed end (201) and an open end (202) with a desiccant (204) inside the e-PTFE tube and a connection end with a valve (310) fluidly connecting the tube to the valve (310) is fitted into a tube guide; and, the tube guide is fluidly connected top an envelope (207) containing a separator material (220/220').

11. The reactor cartridge of claim 10 further comprising adding desiccant material (235) around the e-PTFE tube.

12. The reactor cartridge of claim 11 wherein at least a portion of the separator material is in contact with the e-PTFE tube in the tube guide.

13. The reactor cartridge of claim 11 wherein no portion of the separator is in contact with the e-PTFE tube in the tube guide.

14. The reactor cartridge of claim 1 wherein the at least one elastomeric winding is not a unitary piece.

15. The reactor cartridge of claim 1 comprising at least two elastomeric winding.

16. The reactor cartridge of claim 14 wherein the elastomeric windings are adapted to apply variable force to different portions of the core.

17. The reactor cartridge of claim 16 wherein elastomeric winding variations to apply variable force include thickness, length and elasticity.

* * * * *